April 15, 1924.　　　　　　　　　　1,490,223
T. MIDGLEY, JR
INDICATOR
Filed April 1, 1920　　　　7 Sheets-Sheet 1

Witnesses
Leo. H. Emrick
Walter W. Riedel

Inventor
Thomas Midgley Jr.
By Kerr, Page, Cooper and Hayward
Attorneys

April 15, 1924.

T. MIDGLEY, JR 1,490,223

INDICATOR

Filed April 1, 1920

T. MIDGLEY, JR

INDICATOR

Filed April 1, 1920

T. MIDGLEY, JR

INDICATOR

Filed April 1, 1920 7 Sheets-Sheet 5

Patented Apr. 15, 1924.

1,490,223

UNITED STATES PATENT OFFICE.

THOMAS MIDGLEY, JR., OF DAYTON, OHIO, ASSIGNOR, BY MESNE ASSIGNMENTS, TO GENERAL MOTORS RESEARCH CORPORATION, OF DAYTON, OHIO, A CORPORATION OF DELAWARE.

INDICATOR.

Application filed April 1, 1920. Serial No. 370,427.

*To all whom it may concern:*

Be it known that I, THOMAS MIDGLEY, Jr., a citizen of the United States of America, residing at Dayton, county of Montgomery, State of Ohio, have invented certain new and useful Improvements in Indicators, of which the following is a full, clear, and exact description.

This invention relates to engine indicators and more particularly to optical indicators.

One of the objects of the invention is to provide an improved type of indicator which is adapted for giving indications in terms of pressure-volume and pressure-time.

Another object is to provide an indicator adapted for giving optical indications, and also adapted for the making of a permanent record of the optical indications, by means of photographic prints of such indications.

A further object is to provide an indicator adapted for giving optical indications and also for giving a permanent record of a single complete cycle of operations.

Other objects and advantages will be apparent from the description of the invention set out below when taken in connection with the accompanying drawing.

In the drawing, in which like characters designate like parts throughout the several views thereof.

Fig. 2^A is a perspective view of one element of the mechanism, viz, the worm, shown in Fig. 2;

The indicator forming the subject of this invention is adapted for use in connection with any type of engine, but it is more specifically devised for use with comparatively high speed engines, such as the modern internal-combustion automobile engine. Many forms of indicators have heretofore been devised and used with more or less success. Most of these indicators are defective when used with higher speed engines, i. e., engines having a speed of operation in excess of 250 revolutions per minute say, because of the inertia effects, which become especially marked at such higher speeds. For use with these higher speed engines certain indicators have been devised in which the weight of the moving parts has been greatly decreased, and the troubles due to the inertia thus lessened. Also, in the desire to avoid these objectionable inertia effects certain, so-called, "optical indicators" have been devised in which some of the parts of the ordinary indicator have been dispensed with, and the indications secured by utilizing a series of mirrors and a beam of light. All of these indicators, have, however, been open to objection for various reasons, especially where used with high speed engines. In addition these indicators have all been primarily designed for giving pressure-volume indications, and their field of usefulness has been somewhat circumscribed.

The indicator forming the subject of this invention is of the optical type, and is primarily designed for the giving of pressure-time indications and has thus opened an entirely new field of study in connection with high speed engines, such as the modern internal-combustion engine.

This indicator consists, as shown in the drawing, of a pressure element, comprising a cylinder 30, having its lower end externally threaded as shown at 31 for insertion within an opening through the wall of a cylinder of the engine with which the indicator is to be used. Mounted within the cylinder 30 is a hollow member 32. This hollow member comprises a hollow body portion 33 having the upper end thereof externally threaded and engaged in the threaded passage within the cap member 34, which is rigidly attached to the upper end of the cylinder member 30, as by means of the sleeve coupling 35. Adjacent its lower end the hollow member 32 consists of a helical spring 36, the end coil of the spring being externally threaded to receive the piston member, which is shown at 37. The hollow member 32, and especially that part of it which forms the spring 36, is preferably of very high grade spring steel. The piston 37, however, is preferably of cast-iron, and is so formed as to make a nice fit within the cylinder member 30. The inner end of this piston 37 is exposed to the pressures generated within the cylinder, and the movement of this piston under the influence of these pressures is dependent upon the resistance of the spring 36. That is to say when pressures in excess of atmospheric are generated within the cylinder these pressures act upon the piston 37 and tend to compress the spring 36, to cause movement of the piston 37 within the cylinder member. In order to secure the desired accuracy, the actual movement or reciprocation of the piston within the cylinder should be limited, most satisfactory results probably being secured with a maximum motion of about one twenty-fifth of an inch.

Figure 9:
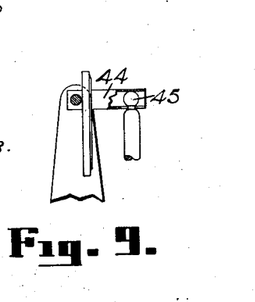
Fig. 9 is a detail view showing the mounting of the mirror carried upon the pressure element.
Figure 10:
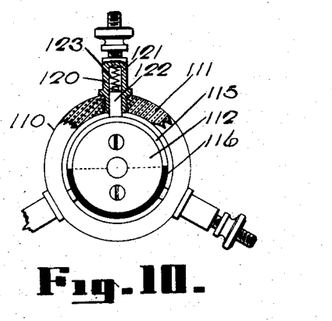
Fig. 10 is a view, partly in section, of the commutator forming a part of the timing device.

In order to limit the movement of the piston within the desired range, the spring 36 must be so proportioned as to have sufficient resistance to distortion under the pressure effects arising within the cylinder as to permit of very limited compression under these cylinder pressures. And obviously by varying the physical characteristics of the spring the indicator may be fitted for use in connection with an engine operating over any desired range of pressures within the engine cylinder. Threadedly engaged in the piston 37, and extending through the hollow member 32 and coaxially therewith, is a connecting rod 38, by means of which operative connection is made between the piston 37 and an oscillatable slightly concave mirror 40. The mirror 40 is rigidly mounted upon a pivot 41 which is carried by a pair of standards 42. These standards are rigidly attached to the upper surface of the cap 34. The standards, if desired, may be formed integrally with the cap 34, but as shown they constitute the legs of a U-shaped member which is rigidly attached to the cap 34 by means of screws 43. Attached to the pivot member 41, and extending at substantially right angles thereto, is an arm 44, the free end of which is operatively connected to the upper end of the connecting rod 38. As shown in the drawing, particularly in Fig. 9, the arm 44 is made of steel tubing of comparatively small diameter, a slot being formed in the open end of the tube to receive the upper end of the rod 38, which is made in the form of a ball, the connection between the rod 38 and the arm 44 thus constituting in effect a ball and socket joint, permitting free movement of the two relative to each other during operation of the device. The tube arm 44, described is used because of its lightness and simplicity of construction and operation, thus having the dual effect of tending to decrease inertia effects and at the same time permit of a simple and cheap construction. Other forms of arm, and means of connecting that arm to the rod 38 might be used if desired.

Figures 1, 11, 12:
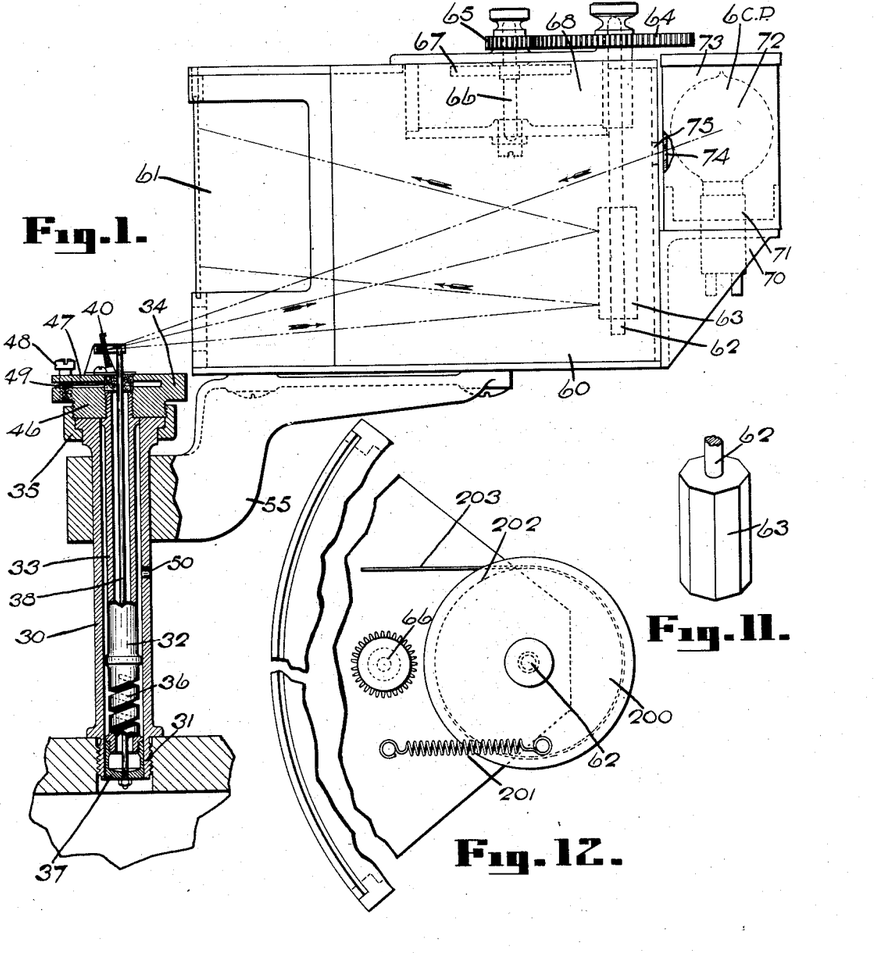
Fig. 1 is a somewhat diagrammatic view, partly in section, of the pressure element, and cooperating optical indicating mechanism, forming a part of this invention.
Fig. 11 is a detail view of the rotatable mirror, shown in Fig. 1, forming a part of the optical indicating mechanism.
Fig. 12 is a plan view, with parts broken away, of a portion of the apparatus shown in Fig. 1, but with slight modification therein adapting the apparatus to the giving of pressure-volume indications.

As shown in the drawing, particularly in Fig. 1, the cap 34 consists of a body portion 46, and a thin disc-like portion 47 which is rigidly attached to the body portion at one side thereof, the free edge of the disc-like portion being held in predetermined position, relative to the body portion of the cap, by means of an adjusting screw 48. The standards 42 are mounted not upon the body portion of the cap, but upon this disc-like portion 47. By means of this construction the position of the mirror 40 relative to the vertical may be varied. That is to say by proper manipulation of the adjusting screw 48 the disc-like portion may be deflected to vary the angular position of the mirror 40, relative to the vertical. The disc-like portion 47 has an opening therethrough, adapted to receive a packing 49, which surrounds the rod 38, and abuts against the upper end of the hollow member 33. This packing member is held in place by means of the body portion of the U-shaped standard bearing member, as shown, and is designed to prevent the escape of pressure fluid from within the engine cylinder, past the piston 37, and out through the hollow member 33. Leaking pressure fluid has a very strong tendency to foul the surface of the mirror and thus destroy its usefulness. A hole 50 is also provided in the wall of cylinder 30 through which any leakage into the cylinder may escape to the atmosphere.

Rigidly secured to the cylinder member 30 is a bracket 55, which has mounted thereon a segment shaped box 60 comprising about a 90° segment. This box, in the form shown in the drawing, consists of a wooden body portion, with a translucent window 61 set in the front thereof. This window is preferably of ground glass, although it may be of any suitable material, it being merely necessary that it be of such material as to cause a beam of light traversing it to make a bright indication thereon, that is it should be translucent. The window 61 is preferably detachably mounted within the curved portion of the box, as shown in the drawing, a slot being provided in the curved front portion of the box, which is of the proper shape and size to receive the window. This construction facilitates the removal of the window to permit of access to the interior of the box, and also lends itself to a ready replacement, in case the window is damaged or broken. Rotatably mounted in the top of the box 60 is a shaft 62 the lower end of which carries thereon a mirror 63. The mirror 63 has a plurality of reflecting faces, the mirror shown in the drawing, which is the form preferably used, having eight reflecting faces, and being in cross section a regular octagon.

Mounted upon the upper end of the rotatable shaft 62 is a gear wheel 64 adapted to mesh with the gear wheel 65 which in turn is mounted upon a shaft 66. The shaft 66 carries the armature member 67 of a motor 68. The motor 68 is shown only diagrammatically herein, inasmuch as such a showing seems to give a clearer idea as to the construction and operation thereof. The motor consists, as shown in Fig. 1, and Figs. 7, 15 and 16 of a series of electromagnets 69 arranged in substantially a circle. There are six of these magnets in the type of motor illustrated, although a greater or lesser number could be used if desired, opposite magnets being connected in the same circuit, so as to be energized or de-energized at the same time and so that two cooperating magnets constitute opposite poles of a magnetic field. The armature 67, comprises a plate-like member mounted upon the shaft 66, and having its free ends extended laterally so that each end may overlie two of the electromagnets. There is of course no direct contact between the armature and the electromagnets. In the operation of this motor the electromagnets are energized in such succession that a continuously progressive motion of the armature about the shaft 66 is secured. Rotation of the armature, during the operation of this motor, produces rotation of the shaft 67, and, through the gears 65 and 64, a corresponding rotation of the shaft 62 and the mirror 63, carried thereby.

Figure 17:
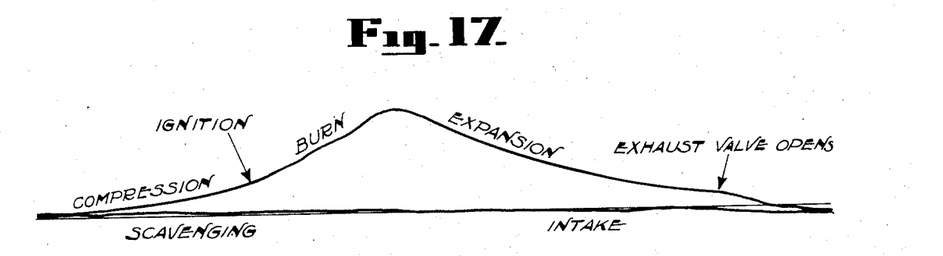
Fig. 17 illustrates a pressure-time indicator card obtained by the use of the indicator of this invention.

Mounted upon the back of the box member 60 is a bracket 70 which carries a lamp socket 71 in which is mounted an incandescent lamp 72. This lamp is preferably of about twenty one candle power, and adapted to function at its normal rating upon a current of six volts. Surrounding the lamp is a cylindrical member 73 having a small hole 74 therein, adapted to cooperate with a corresponding hole 75 in the back of the box 60. The two cooperating holes 74 and 75 are so positioned relative to the lamp that a beam of light from the lamp passing therethrough will fall upon the oscillatable mirror 40. And the oscillatable mirror 40, rotatable mirror 63 and translucent window 61 are so positioned relative to each other that a beam of light falling upon the mirror 40, from the lamp 72, will be reflected to the rotatable mirror 63 and thence to the window 61. As the mirror 40 oscillates about its horizontal pivots the beam of light falling thereon, from the lamp 72, will impinge upon the mirror 63 at varying points thereon, relative to the vertical, and consequently will be reflected to fall upon the window 61 at varying points, along the vertical. As the mirror 63 rotates, the angular relation of that face thereof upon which a beam of light from the mirror 40 is impinging will continuously vary so that the point along the horizontal that such reflected beam of light falls upon the window 61 will be continuously shifting during rotation of this mirror 63. Inasmuch as the oscillations of the mirror 40 take place in accordance with variations in the pressure within the engine cylinder, the beam of light reflected from the mirror 40 will tend to move over the window 61, throughout a more or less definite vertical range. By rotating the mirror 63 at a certain predetermined rate of rotation relative to the speed of operation of the engine the beam of light falling upon the window 61 will be caused to move through a definite horizontal range. In the construction shown, the speed of rotation of the mirror 63 is so proportioned relative to the speed of operation of the engine that this mirror always turns at one eighth engine speed. Since the mirror has eight reflecting faces, and its speed of rotation is one eighth engine speed one face of the mirror corresponds to one complete revolution of the engine, that is two of the four cycles which are characteristic of the Otto-cycle internal-combustion engine. As a result of this construction of the rotatable mirror 63, and its predetermined speed relative to the speed of the engine, a beam of light reflected from the mirror 40 to any face of the mirror 63 will traverse the complete horizontal range upon the window 61 during one complete revolution of the engine. That is to say, by this construction one face of the mirror 63, during rotation, will cause a beam of light to travel horizontally across the window 61 throughout the complete horizontal range, this horizontal range thus corresponding to one complete revolution, or two cycles, of an Otto-cycle engine. Inasmuch as the mirror 40 is also being oscillated at this same time in accordance with varying pressures within the engine cylinder the beam of light will at the same time be caused to move in a vertical direction, the result being the traverse of a line of light along the window 61 which is distinctly visible and which makes a distinct impression upon the eye. This instrument has been used primarily for studying conditions within the cylinder of an internal-combustion engine during the cycles of compression and expansion. In Fig. 17 is shown a reproduction of the type of indication that is secured during use of this indicator upon an internal-combustion engine of the character described. It is to be borne in mind that while the importance of a particular part of the indication is here stressed, the instrument really gives an indication of the complete cycle of operations in an internal-combustion engine, the exhaust and intake cycles being shown just as clearly as the other two cycles, so that a "card" which is obtained from the use of this instrument is a complete diagram of the operation of the engine in terms of pressure and time. The "card" reproduced in Fig. 17 clearly shows this characteristic.

In operating this device it is essential that the mirror 63 be rotated at a speed which bears a definite relationship to the speed of operation of the motor. That is to say, in order to get an indication which gives pressures in terms of time intervals, it is essential that the mirror 63 be so constructed, as to the number of reflecting faces thereon, and so operated that the indication secured will give the pressure with a definite relationship to the time of operation. To secure this desired condition mechanism is provided for rotating the mirror 63 at a speed which bears a predetermined relation to the speed of operation of the engine, under all varying operating conditions. This mechanism is shown in detail in Figs. 2 et seq.

Figures 2, 3:
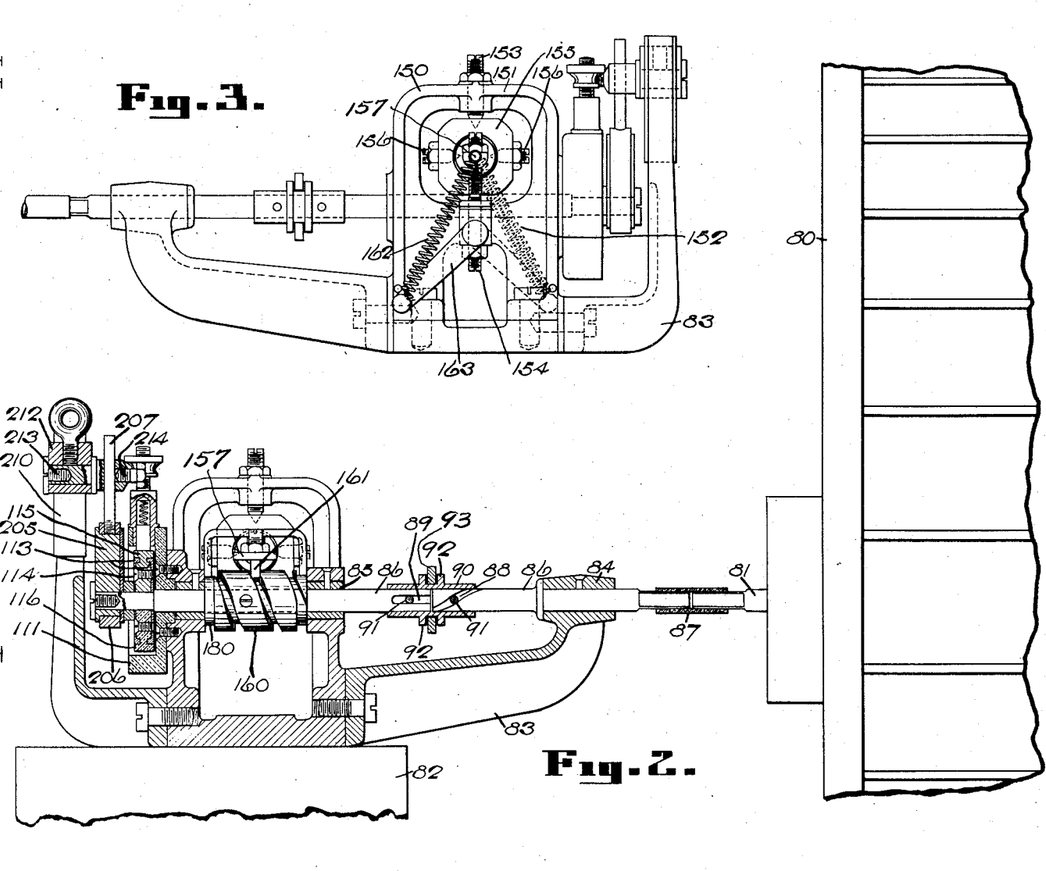
Fig. 2 is a view, partly in vertical section, of the timing device forming a part of the invention.
Fig. 3 is a view in elevation from the opposite side, of that part of the indicator illustrated in Fig. 2.
Figure 2A:
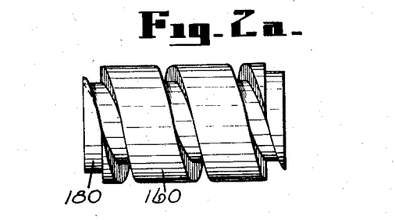
Figures 4, 13, 14:
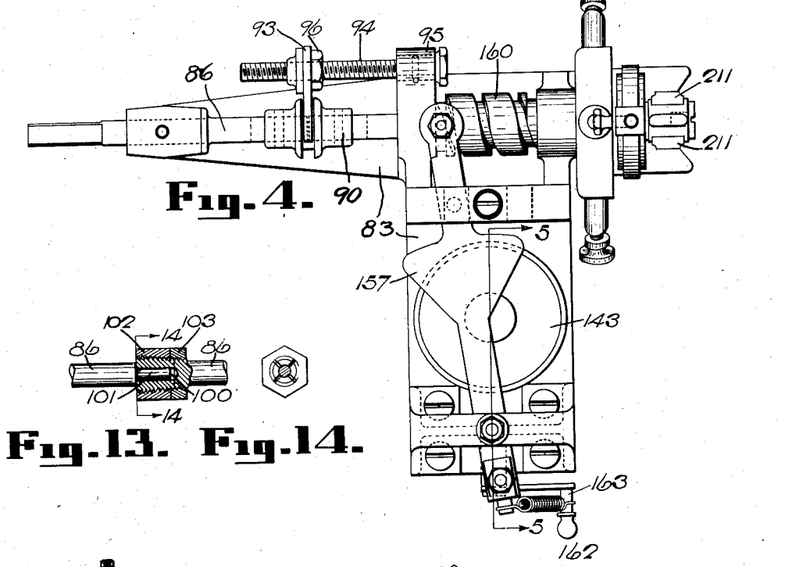
Fig. 4 is a plan view of the apparatus illustrated in Fig. 2.
Fig. 13 is a modified form of coupling, shown partly in section, for the shaft of the timing device.
Fig. 14 is a view of the same form of coupling along the line 14—14 of Fig. 13.
Figures 5, 6:
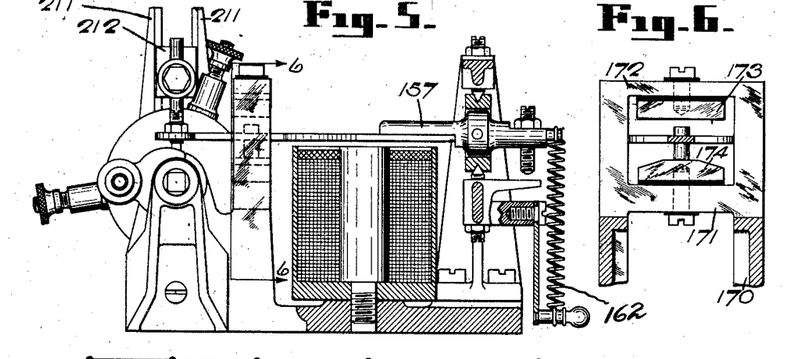
Fig. 5 is a view, partly in section, of the apparatus illustrated in Figs. 2–4, the section being along the line 5—5 of Fig. 4.
Fig. 6 is a detail view showing the cam contact forming a part of the apparatus shown in Figs. 2, 3, 4 and 5.

In Fig. 2 the numeral 80 designates a flywheel fan of an air-cooled internal-combustion engine, which is mounted upon the crank shaft of the engine. Mounted upon the free end of the crank shaft, which extends through the flywheel is the extension 81, which constitutes a true extension of the crank shaft. That is to say the extension 81 is truly co-axial with the crank shaft. Rigidly attached to a suitable support 82, and properly positioned relative to the extension 81 is a frame member 83 which carries therein, in suitable bearings 84 and 85 a two part shaft 86. The shaft 86 is preferably so arranged that throughout its length it is co-axial with the extension 81, and one portion of the shaft has its free end in driving connection with the extension 81 by means of a flexible coupling. As shown in the drawings, the flexible coupling may consist merely of a heavy rubber tube 87. Other types of flexible coupling may be used if desired, as for instance a typical swiveled universal joint. The adjacent ends of the two portions of shaft 86 are rigidly connected to each other, the connection being such that the angular relation of the two shafts relative to each other may be changed if desired. In Figs. 2, 3 and 4 is shown one type of connection for these two shafts. In the type shown one of the portions of the shaft 86 has a helical groove 88 therein, while the cooperating end of the other portion of the shaft has a longitudinal groove 89 therein. Surrounding the cooperating ends of the two portions of the shaft is a sleeve 90 having two small lugs 91 therein one of which is adapted to engage in the groove 88 and the other in the groove 89. The sleeve 90 has a pair of flanges 92 thereon which are so positioned as to receive the forked ends of an adjusting member 93. Passing through the member 93 and threaded therein, is a member 94 which is swiveled in an extension 95 of the frame 83. Rotation of the member 94 will cause movement of the adjusting member 93 relative thereto, and this in turn will move the sleeve 90 longitudinally of the shaft 86. Such movement of the sleeve, because of the helical groove 88, and the lugs 91 therein, will cause a variation in the relative angular position of the two portions of the shaft 86. A lock nut 96 is provided for holding the adjusting member 93 in any desired position upon the threaded member 94 to thus maintain any predetermined relative adjustment of the two portions of the shaft 86. If desired the type of coupling and adjusting member shown in Figs. 2, 3 and 4 may be dispensed with, and a coupling such as that shown in Figs. 13, and 14 used in lieu thereof. In this modified form of coupling one portion of the shaft 86 has a socket 100 therein adapted to receive an extension 101 of the other portion of the shaft. The walls of the socket portion 100 are slitted, and externally threaded, and have a threaded clamping sleeve 102 thereon. By proper manipulation of the clamping sleeve 102 the extension 101 may be rigidly clamped within the socket 100 for giving a driving connection, or may be adjusted within such socket member to give any desired angular relation of the two portions of the shaft relative to each other. Lock nut 103 is provided for locking the sleeve 102 in clamped position.

Mounted upon the free end of the other portion of the shaft is a contact making device designated generally by the numeral 110. This contact making device is adapted to control the operation of the motor 68, and since the motor has three pairs of magnets, the contacting device has three contacts. As shown in the drawing this contact making device consists of a stationary cup-shaped member 111, which is preferably made of some form of electrical insulation. Carried upon the free end of the shaft 86, and adapted to rotate within the cup-shaped member 111 is a disc 112. This disc consists of two plate members 113 which clamp between them, by means of screws 114 two members 115 and 116. The member 115 is composed of a material which is an electrical conductor, and is in electrical connection with the shaft 86, and is thus grounded. The member 116 is composed of some material, such as horn fiber, which is a non-conductor of electricity. The member 112 thus constitutes in effect the rotating element of a commutator. For low speed engines the two members may each form half of the disc, but for high speed engines it has been found preferable to extend the conductor member 115 so that it occupies about 195° of the periphery. Passing through the cup-shaped member 111 are three members 120, each of which constitutes in effect, a commutator brush. As shown in the drawing each of the members 120 comprises a hollow binder post 121, mounted within the cup-shaped member 111, and having a spring pressed contacting or brush member 122 mounted therein and adapted to be forced into contact with the periphery of the disc member 112 by means of a spring 123. The outer end of the binder post is adapted to receive an electrical conductor. The periphery of the member 112, with which the brush members 122 contact, is, because of the construction of the member 112, substantially half conductor and half non-conductor. The brushes 122 are arranged 120° apart, and consequently the arrangement is such that two brushes may make contact with the non-conductor half of the member 112 and the other brush with the conductor half, or vice versa. This arrangement is such that during operation of the device, and rotation of the disc member 112, two adjacent pairs of magnets, in the motor are energized at the same time and then upon further rotation of the contacting device, the third pair of magnets becomes energized while one of the other two becomes deenergized so that the pairs of magnets are energized and deenergized progressively. As a result of the energizing of these magnets during the operation of the engine, there is a continuous rotation of the flux about the center of the motor and the armature follows this advancing flux. The shaft 86 is driven at engine speed, it being connected directly to the crank shaft of the engine without any speed reduction. The contacting device therefore also operates at engine speed, and consequently the motor 68 will also operate at a definite predetermined rate relative to the speed of operation of the engine.

Figure 7:
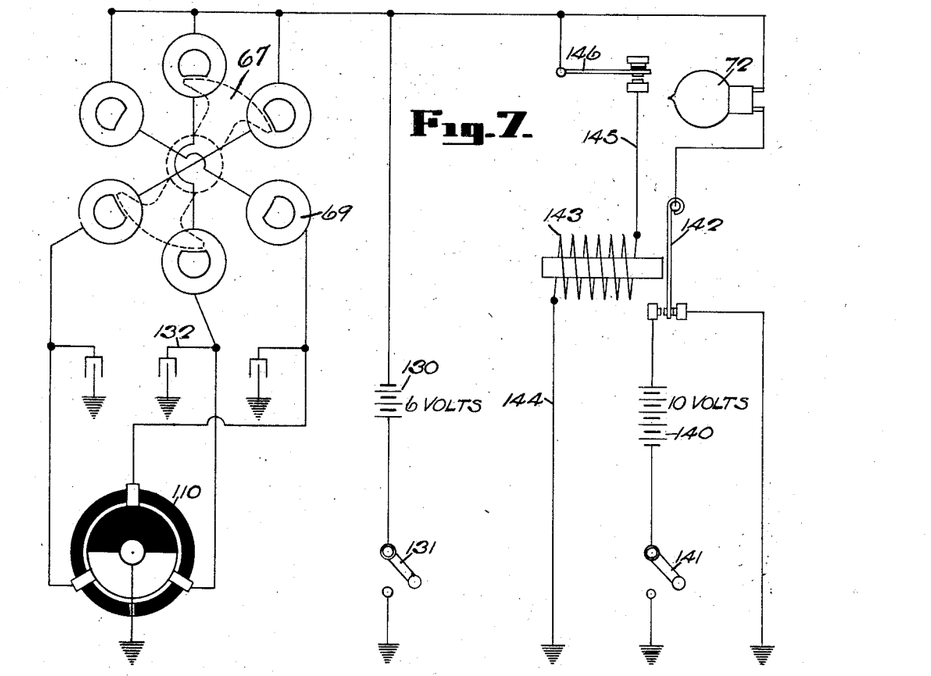
Fig. 7 is a wiring diagram of the complete indicator mechanism.
Figure 8:
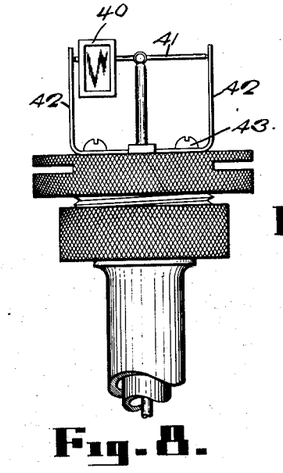
Fig. 8 is a detail view of the upper part of the pressure element.

As shown, for example, in Fig. 7 of the drawing the lamp 72 is normally operated by the six volt battery 130, the motor 68 being also adapted to operate upon current from the same battery. Each of the binder posts 120 is connected to one of the magnets 69, which magnet is in turn connected to the diametrically opposite magnet and thence through the battery 130, and the switch 131, to ground. As set forth above, the conductor portion of the disc member 112 is also connected to ground through the shaft of the contacting device. Each of the commutator elements has a condenser 132 connected in circuit therewith to prevent sparking.

For continuous pressure-time optical indications, during operation of the engine, the operation is comparatively simple. As the engine operates, the shaft 86 is driven in synchronism therewith thus operating the contact device 110 with a resultant operation of the motor 68 to cause a rotation of the mirror 63 at the predetermined relative rate. The switch 131 of course must be closed before there can be operation of the indicator. When the switch 131 is closed the lamp 72 begins to function and a beam of light passes to the oscillatable mirror 40 thence to the rotatable mirror 63 and thence to the window 61 to give an optical indication thereon. As the engine is operated the mirror 40 is oscillated about its horizontal pivots and the mirror 63 is rotated about its vertical axis. The result is a continuous optical indication on the window 61 of conditions within the engine.

The mechanism thus far described lends itself to the giving of optical indications. It is obvious that conditions might arise when it would be desirable to have permanent records of operations within the engine cylinder for more careful and detail study, as well as for permanent record. To get this condition, mechanism is provided, which in conjunction with the apparatus thus far described permits of making photographic records of the indications. It is evident that, where a high speed engine is used, the number of indications per minute will be so great that it would be impossible to place a photographic medium in position to secure a photograph of a complete cycle of operation of the engine without having its subsequent usefulness destroyed by having superimposed thereon photographs of other complete cycles of operation. This device is adapted therefore not only for the making of a photographic record but also for taking a photographic record of any desired part of a complete cycle of operations of the engine, without getting a photograph of any of the other cycles of operations.

Figure 15:
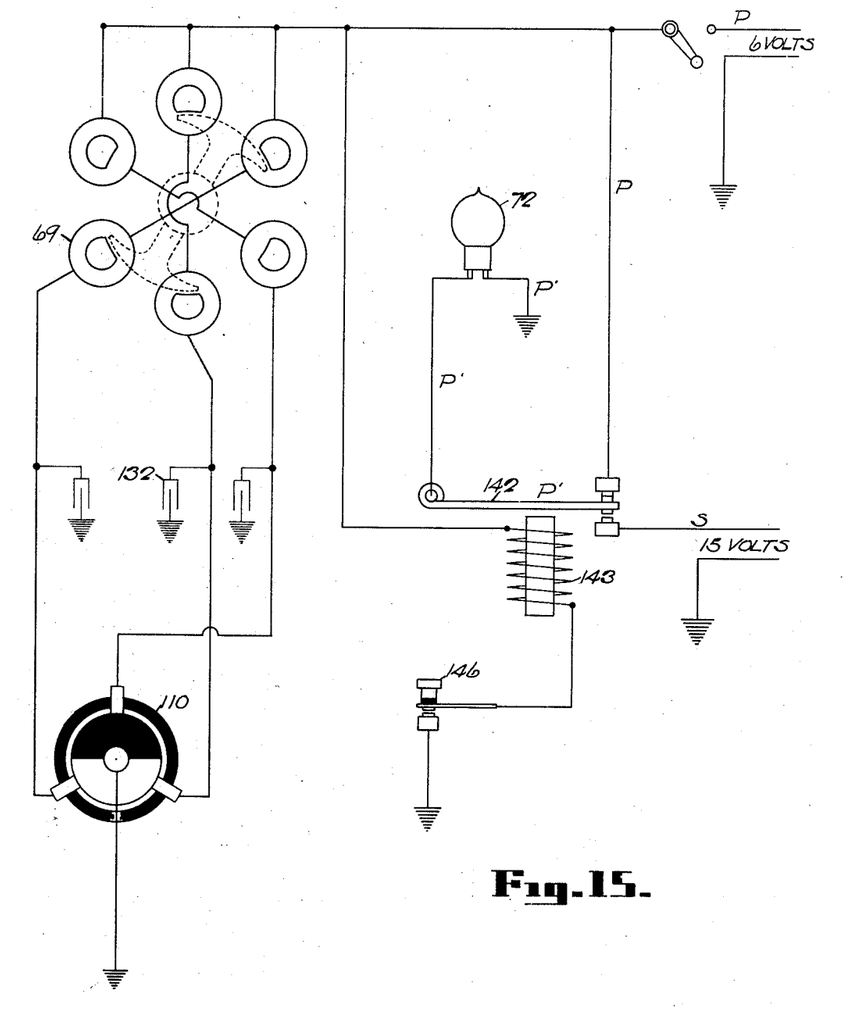
Fig. 15 is a wiring diagram of a slightly modified form of apparatus.
Figure 16:
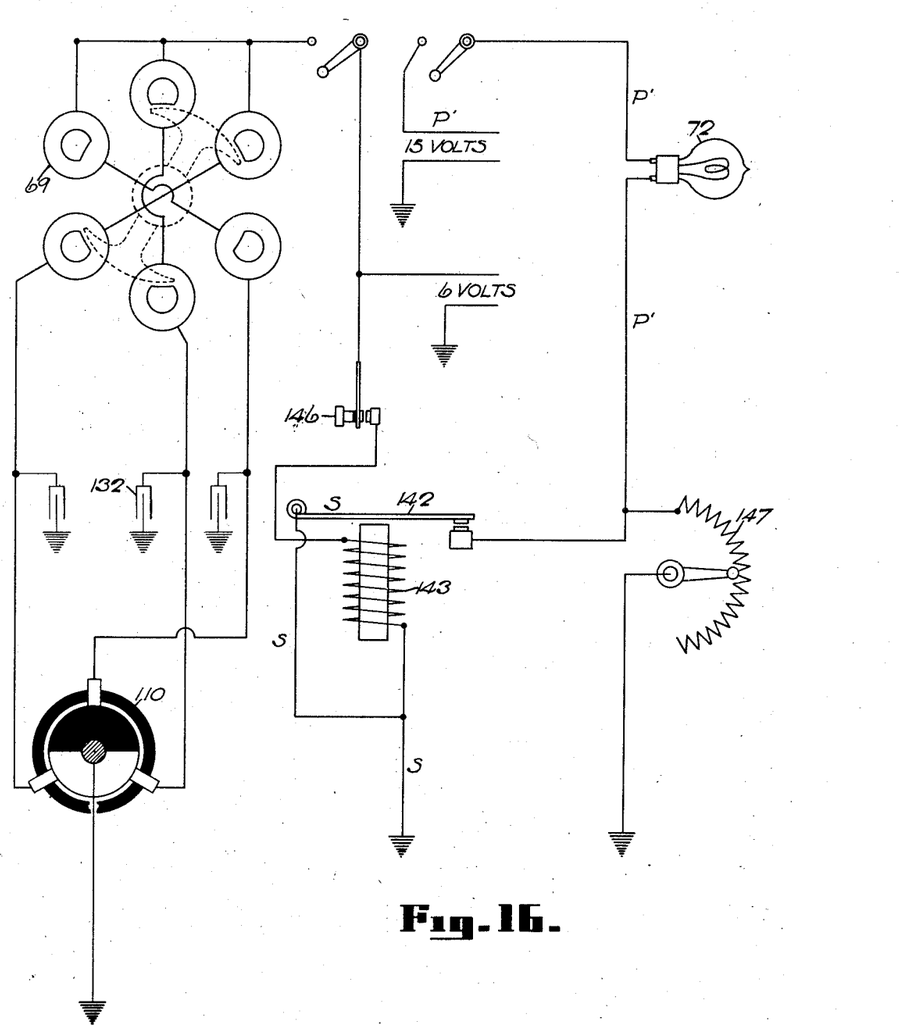
Fig. 16 is a wiring diagram of still another slightly modified form of apparatus.

The apparatus for accomplishing these results is shown in detail in Figs. 2 et seq., and diagrammatically in Figs. 7, 15 and 16. Broadly this apparatus consists of mechanism adapted to increase the intensity of the light given off from the incandescent lamp 72 sufficiently to cause that light to directly affect photographic sensitized paper, and associated apparatus adapted to limit the period of increased intensity of the lamp 72 to any desired period of the operation of the engine. As shown diagrammatically in Fig. 7 a supplementary battery 140, adapted in the type of device illustrated to give a current of ten volts, is provided, one pole of which may be grounded, through the switch 141. Included within the circuit connecting the lamp 72 to the battery 130 is a two-way magnetically operated switch designated generally by the numeral 142. Located adjacent switch 142 is an operating magnet 143 one terminal of which is grounded through the conductor 144 while the other terminal is connected through the conductor 145 and manually operated switch 146 to the six volt battery 130. The magnetically operated switch 142 is adapted normally to connect the lamp 72 with the six volt battery 130. This switch is also adapted, upon energizing of the magnet 143, to cut into the lighting circuit the ten volt battery 140, thus subjecting the lamp 72 to a current of sixteen volts. This causes a great increase in the intensity of the light generated by the lamp 72, the intensified light being particularly rich in actinic rays, which most actively affect a sensitized photographic paper.

Fig. 15 shows the modified system of wiring in which the lamp is normally operated by the six volt circuit, but in which, upon operating the push button 146, the lamp is cut out of the six volt circuit and into a separate circuit of fifteen volts. Suitable sources of current for the two circuits are connected at the points marked, respectively, "six volts" and "fifteen volts".

In Fig. 16, there is shown still another system of wiring for accomplishing a like result. In this system the lamp is normally in a fifteen volt circuit, but the circuit also includes a resistance element 147 to decrease the intensity of the light. However, when the push button 146 is operated the resistance element is cut out and the lamp receives the full fifteen volts with the corresponding increase in intensity of light.

In Fig. 15, the circuits are indicated, the six volt, by the letters P, P, P', and P' and, the fifteen volt, by S, P', P'. In Fig. 16, the normal current flows through the leads P' and resistance 147 while the abnormal current flows through leads P', P', S, S.

Describing this apparatus more in detail, the frame 83 carries an electromagnet 143, one terminal of which is connected directly to the push button, shown diagrammatically in Fig. 7, at 146, the other terminal being grounded. The frame 83 also carries an upward extension 150 which has a pair of substantially parallel horizontal cross arms 151 and 152. Mounted between the cross arms 151 and 152 are two, oppositely disposed vertical pivot members 153 and 154 which are adapted to support between them a ring member 155, which is so mounted as to be capable of oscillating motion about the vertical pivots. Mounted in the member 155 are two horizontally arranged pivots 156 which support between them an armature member 157. This construction permits of movement of the armature member in both a horizontal plane and in a vertical direction. Carried upon the shaft 86 is a worm 160, which is preferably of some electric insulation, such as horn fiber. If desired this worm may be made of metal and insulated from the shaft, rather than being made entirely of insulation material. It is found however, that a worm made of horn fiber functions very satisfactorily. Carried upon the free end of the armature 157, adjacent the worm 160 is an adjustable pin 161, adapted, when the armature is pulled down, upon the energizing of the magnet 143, to ride in the thread of the worm. The worm 160 being rigidly attached to the shaft 86 rotates with that shaft, at all times during engine operation, at engine speed. It is obvious that as the magnet 143 is energized the armature member will be pulled down and the pin 161 caused to engage in the thread of the worm. As a result the armature will swing about the pivots 153 and 154 as the pin is advanced by the turning worm. The opposite free end of the armature has a spring 162 attached thereto, one end of the spring being attached to an arm 163 which is pivoted to the lower cross arm of the member 150. This spring is of the so-called "over-center" type. That is to say the spring is under greater tension when the member 163 is positioned with its pivot and free end in alignment with the free end of the armature member than in other positions of the armature. Consequently when the armature is caused to travel by the worm and cooperating pin the spring tends to return it to initial position. Of course different types of engines revolve in different direction, some clockwise and some anti-clockwise. The member 163 is pivoted in order to permit of adjusting the mechanism so that it may operate with an engine turning in either direction. That is, by positioning the member 163 as shown in the drawing in full lines it is adapted to operate in connection with an engine turning in one direction and by positioning the member 163 in the position shown in dotted lines in the drawing it will be adapted to operate in connection with an engine turning in the opposite direction. The armature 157 has two contact making members thereon, one carried by the upper surface thereof and the other carried by the lower surface. Carried by the frame 83 is an upstanding member 170 having two cross arms 171 and 172. These cross arms are so positioned that the end of the armature carrying the pin 161, is adapted to swing therebetween. The upper cross arm carries a contact member 173 upon the lower face thereof, which contact member is connected to the six volt battery 130 through ground and to one terminal of the lamp 72. The lower cross arm 171 carries opposite the contact member 173, a contact member 174 which is connected to the ten volt battery 140 and is adapted to be connected, through the armature 157, of the magnetically operated switch 142, to one terminal of the lamp 72. The worm 160 has a thread therein of such lead that the pin 161 will travel the entire length of the worm during two revolutions of the shaft 86. That is to say two complete revolutions of the engine,—a complete cycle of operations of the engine,—is necessary for causing the pin 161 to travel the entire length of the worm, and thus carry the armature member completely across the contact member 174.

In order to take a photographic record of any particular part of a cycle of operations, it is sufficient to hold sensitized paper against the window 61 and close switch 146 manually. The electromagnet 143 is thus connected in circuit with the six volt battery 130 and energizes the magnet causing the armature member 157, that is the switch 142, to be pulled down to bring the pin 161 into the thread of the worm 160. When the armature is moved in this position it is caused to contact with the contact member 174 thus connecting the lamp to the ten volt battery 140 as well as to the six volt battery 130. The lamp is thus caused to give out a light of very high intensity, rich in actinic rays, and as a result a bright line is traced upon the photographic paper. As the worm rotates the pin 161 is moved across and the armature carried across the member 174, the pin reaching the end of its travel as two complete revolutions of the engine are completed. Consequently the photographic reproduction will show a complete cycle of operations of the engine, including intake, compression, burn or expansion, and exhaust. At the terminal end of the worm a circular groove 180 is provided which is sufficiently wide to receive the pin 161, when the pin has been caused to travel to the end of the worm. Therefore, if the magnet is still energized the armature will still be held down, and the pin will continue to travel in this circular groove. The contact 174 is so positioned that when the pin has been moved into the groove 180 the armature 157 is no longer in contact with this contact member 174. Consequently even though the magnet may be still energized when the pin has moved into the groove 180 the lamp 72 will no longer be connected with the ten volt battery in addition to the six volt battery, and consequently will not continue to give out the intense light rich in actinic rays and so there will be no affecting of the photographic paper. It is found, that by this construction it is possible to take a photograph of any complete cycle of operations, even though the rate of operation of the engine is so rapid that it would be impossible to close the contact member 146 and then open it, manually, in a sufficiently short time to thus secure a photographic copy of a single complete cycle of operations. The mechanism described will cause a photograph of this complete cycle of operations to be taken, and only one complete cycle of operations will show regardless of how long the contact 146 may be maintained closed. By properly proportioning the lead of the worm thread the apparatus may be designed to take any one of the four cycles of a complete operation of an engine or any definite number of these cycles.

It is of course obvious that instead of photographic paper other photographic media may be used with the production of the corresponding record. For example, if a negative is desired, a photographic film might be used instead of the paper which gives a positive.

The apparatus has been described above as adapted for taking pressure-time cards only. As stated heretofore, the device was primarily designed for giving pressure-time indications, the desire being to study conditions within the cylinder of a gas engine, particularly during the burning or expansion cycle. This apparatus, is however, with very slight modification, just as efficient in the giving of pressure-volume indications as it is in giving pressure-time indications. Where it is desired to get pressure volume indications means are provided whereby an oscillatory motion is given to the mirror 63, instead of the rotary motion described above. In order to give the desired oscillatory motion to the mirror 63 the gear 64, carried by the upper end of the shaft 62 is removed and a small pulley 200 substituted therefor, as shown in Fig. 12. Associated with the pulley 200 is a spring 201, one end of which is attached to the pulley, and the other end to the box 60, in any desired manner, the spring being adapted to normally hold the pulley in a predetermined position and to return the pulley to a predetermined position when it has been oscillated upon the shaft 62. The pulley 200 has a groove in the periphery thereof, shown by the dotted line 212 in Fig. 12, this groove being adapted to receive a cable 203, one end of which is made fast to the pulley, the other end being adapted for attachment to certain mechanism which is actuated in synchronism with the engine and which is adapted, through the cable 203, to oscillate the pulley, and the mirror 63 in synchronism with the engine.

The mechaninsm for oscillating the pulley in synchronism with the engine is shown in Figs. 2 et seq. As shown this mechanism consists of an eccentric 205 mounted upon that end of the shaft 86 which carries the contact making device 110. Surrounding the eccentric is a strap 206, both eccentric and strap being made of any desired materials, which has threaded therein an upward extending rod 207. Carried by the frame 83 is an upward extension 210, which at its upper end is bifurcated to form two upstanding guides 211. Mounted between the guides 211 is a slide member or cross head 212 which carries therein a swiveled member 213, extending beyond the guide, the extension having a passage therethrough and adapted to receive the rod 207. Mounted in the extension is a set screw 214 adapted to lock the arm within the extension. As the shaft 86, and the eccentric 205 carried thereby revolve the rod 207, being held against rotary motion by the cross head 212 is given reciprocatory motion, the cross head or sliding between the guides 211, the swiveled member 213 permitting this motion of the various parts. The cross head carries a screw-eye to which cable 203 is attached, the reciprocatory motion of the rod being thus transmitted to the pulley 200 to give the desired oscillation of the mirror 63. This device is adapted for giving an optical indication in terms of pressure-volume, and is also adapted for making photographic records of such pressure-volume indication, as in the case of pressure-time indication. No further description of the photographic element of the device, is thought necessary.

One feature of this part of the device however is especially important. Because of the construction shown the slide or cross head 212 may be adjusted vertically, that is longitudinally, of the rod 207, by means of the set screw 214. By varying the positioning of this member longitudinally of the rod 207 the errors due to the angularity in the piston rod connections may be entirely compensated for, it being merely necessary to vary the position of the member 212 to compensate for this error.

While the form of mechanism herein shown and described constitutes a preferred form of embodiment of the present invention, it is to be understood other forms come within the spirit of the invention and of the scope of the claims which follow.

What I claim is as follows:

1. An engine indicator comprising in combination with an engine, a pressure element responsive directly to pressures within a cylinder of the engine; optical indicating mechanism associated with the pressure element; and means associated with the engine and optical indicating mechanism for actuating said indicating mechanism at a predetermined rate relative to the rate of operation of the engine.

2. An engine indicator comprising in combination a pressure element, having an oscillatable mirror associated therewith; a rotatable mirror, in properly spaced relation to said oscillatable mirror; an electric motor operatively connected to said rotatable mirror; and a timing device associated with said motor and adapted for actuation by an engine to cause operation of said motor and mirror at a speed having a predetermined relation to the speed of operation of the engine.

3. An engine indicator comprising in combination a pressure element; optical indicating mechanism associated therewith and adapted for making a photographic record of the indications thereof; means associated with said optical indicating mechanism for actuating said mechanism at a rate having a predetermined relation to the engine speed; and means cooperatively associated with the said actuating means adapted to permit of making a photographic record of a single operation of the engine regardless of the speed thereof.

4. An engine indicator adapted for use with an internal-combustion engine, or the like; comprising in combination a pressure element, having an oscillatable mirror associated therewith; a rotatable mirror; a translucent plate; a source of light, the two mirrors and the plate being so arranged that a beam of light from said source falling upon the oscillatable mirror will be reflected to the rotatable mirror and then to the plate; a motor for actuating said rotatable mirror; timing mechanism connected to the motor, and adapted for actuation with the engine, constructed to cause rotation of said rotatable mirror at a speed having a predetermined relation to the speed of operation of the engine; and means associated with the timing device and the source of light constructed to cause development of rays of actinic light during a definite cycle of operation of the engine regardless of the speed of operation thereof.

5. In an engine indicator, optical indicating mechanism, adapted for making a photographic record of the indications thereof, and comprising a source of light; means associated with said source of light to cause the emission of actinic rays therefrom, said means being constucted to cause the emission of actinic rays only during a predetermined period of operation of the optical indicating mechanism.

6. In an engine indicator, optical indicating mechanism; a source of light therefor comprising an incandescent lamp adapted to normally function upon its rated current; and means associated with the said lamp for causing the flow of an abnormal current therethrough during a predetermined period of operation of the optical indicating mechanism.

7. In an engine indicator, a pressure element having an oscillatable mirror carried thereby; a rotatable mirror, means associated with said rotatable mirror for actuating it at a speed having a predetermined relation to the engine speed; a translucent plate; an incandescent lamp adapted during operation of the engine to normally function upon its rated current, the lamp, oscillatable mirror, rotatable mirror and translucent plate being so relatively positioned that a beam of light from the lamp falling upon the oscillatable mirror will be reflected to the rotatable mirror and then to the translucent plate; a contacting mechanism so constructed that upon actuation an abnormal current will flow through the lamp, the flow of current taking place during a definite period of operation of the engine regardless of the relative time of actuation of said mechanism.

8. In an indicator, the combination with an engine of optical indicating mechanism comprising a rotatable mirror having a plurality of plane faces, and means for rotating said mirror at a rate having a predetermined relation to the speed of rotation of the engine, the number of reflecting faces of the rotatable mirror being predetermined to accord with the speed of rotation of said mirror relative to the speed of the engine.

9. In an engine indicator, optical indicating mechanism comprising a mirror, adapted for either rotation or oscillation; and electrically operated means associated with said mirror and constructed for attachment to an engine to actuate said mirror at a predetermined speed relative to the speed of operation of the engine.

10. In an engine indicator, optical indicating mechanism comprising a rotatable mirror having eight plane faces, the mirror being in cross section a regular octagon; and means cooperating therewith and constructed for attachment to an engine, said means comprising elements adapted to be operated by and timed by the engine to cause rotation or oscillation of said mirror at a predetermined speed relative to the speed of the engine.

11. An engine indicator comprising a translucent plate, mechanism associated with an engine and with the said plate constructed to give a light-line indication upon said plate; and means cooperating with said mechanism constructed to give to the light rays causing said light-line indications such properties that said rays will directly affect sensitized photographic paper to record during a predetermined period.

12. An engine indicator comprising a pressure element; an oscillatable mirror associated therewith; a rotatable mirror, a translucent plate; a source of light, the oscillatable mirror, the rotatable mirror, the translucent plate and a source of light being so positioned relatively that a beam of light from the source falling upon the oscillatable mirror will be reflected to the rotatable mirror and then to the translucent plate; said light being normally of such character as to give optical indication upon said plate; and means associated with said light adapted to cause generation of actinic rays capable of directly affecting sensitized photographic paper held against said translucent plate.

13. In an engine indicator, the combination of optical indicating mechanism; and timing apparatus therefor, said apparatus comprising a motor, a contacting device for causing operation of said motor, and a shaft for actuating said contacting device, said shaft being adapted for attachment to, and operation by, an engine.

14. In an engine indicator, the combination with an engine, of optical indicating mechanism; and timing means associated with said engine and optical indicating mechanism, said means comprising a motor, a contacting device for causing operation of said motor, a shaft for actuating said contacting device, and adapted for driving connection with crank shaft of the engine, or an extension thereof, said driving connection being by means of a universal joint.

15. In combination with an optical engine indicator, including a source of light normally non-actinic, a timing mechanism capable of causing said light to become actinic during a predetermined number of revolutions of the engine shaft, said timing mechanism including a worm corresponding in length to the said predetermined number of revolutions.

16. In an optical engine indicator, an incandescent lamp adapted to function normally upon its rated current, a source for said current, manually operated means for causing abnormal flow of current through said lamp, and means for automatically terminating said abnormal flow at the end of a predetermined period of operation of the indicator.

17. A pressure element for engine indicators comprising a casing adapted to be attached to the engine cylinder wall; a piston within said casing and so located as to have one end thereof substantially in the plane of the inner wall of said cylinder; and means connected with the piston for indicating fluctuations of pressure within the cylinder acting upon the piston.

18. A pressure element for optical engine indicators, comprising a casing adapted to be attached to the engine cylinder wall, pressure responsive means within said casing and adapted to be positioned substantially flush with the inner cylinder wall, and a mirror connected with said pressure responsive means and oscillatable thereby.

19. A pressure element for optical engine indicators, comprising a casing adapted to extend through the engine cylinder wall, pressure responsive means within the end of said casing and adapted to be positioned substantially flush with the inner wall of said cylinder, means attached to said pressure responsive means adapted to oscillate a mirror mounted upon the other end of said casing.

20. A pressure element for optical engine indicators, comprising a tube adapted to be screwed into the engine cylinder wall, a piston slidable within one end of the tube, a spring for resisting the movement of the piston, a rod attached to the piston and extending concentrically through the tube, a mirror pivotally mounted on the other end of the tube and adapted to be oscillated by the rod upon movement of the piston.

21. A timing device for engine indicators, comprising a frame; a shaft mounted therein and adapted to be rotated by the engine shaft, means permitting angular adjustment of said shaft with relation the engine shaft, means carried by the first mentioned shaft for causing operation of indicator parts at a speed bearing a predetermined relation to the speed of the engine, and further means carried by said first mentioned shaft for causing operation of other parts during a predetermined number of revolutions of the engine.

22. In an optical engine indicator, comprising a pressure element, a source of light, and a rotatable mirror adapted to cooperate therewith to give visible indications, a timing device for regulating the speed of rotation of said rotatable mirror; the timing device comprising a shaft adapted to be rotated by the engine shaft; means carried by the first mentioned shaft for timing the rotation of the rotatable mirror and means coacting with said first mentioned shaft to cause an increase in intensity of the light from said source of light during a predetermined number of revolutions of the engine shaft.

23. In an optical engine indicator, a timing device for the optical indicating means comprising a shaft rotatable at engine speed a commutator upon said shaft adapted to complete a circuit including a source of electric current and an impulse motor connected with the optical indicating means, said commutator being provided with such a number of brushes as to give a predetermined desired number of impulses to the motor for each revolution of the engine.

24. In an optical engine indicator, a rotatable mirror having a plurality of plane faces and means for causing rotation thereof at a speed having a predetermined relation to the engine speed, said means comprising an electric motor, a source of electricity and a commutating device operable by the engine to make and break circuits through successive field magnets of said motor to cause revolution of the motor armature at a speed having a fixed relation to the speed of operation of the commutating device and of the engine.

25. An optical engine indicator provided with means whereby a photographic record of the indication may be made, said means including an incandescent lamp normally receiving insufficient current to cause the photographic impression, and means whereby additional current may be supplied to said lamp for a predetermined portion of the cycle of operation.

26. An optical engine indicator provided with means capable of making a photographic record of the indications said means including a source of light normally incapable of producing photographic impression, a timing device for said indicator, means associated with said timing device for increasing the intensity of light during a predetermined number of revolutions of the engine.

27. In combination, an engine indicator adapted for indicating the cycle of operations in a high speed engine and means for recording during the continuing operation of the indicator the indications of a predetermined number of said cycles.

In testimony whereof I hereto affix my signature.

THOMAS MIDGLEY, Jr.

Witnesses:
J. E. McDonald,
H. E. Sollenberger.